(12) United States Patent  (10) Patent No.: US 9,784,424 B2
Sakashita et al.  (45) Date of Patent: Oct. 10, 2017

(54) AUTOMOTIVE LAMP

(71) Applicants: KOITO MANUFACTURING CO., LTD., Minato-ku, Tokyo (JP); TOYOTA JIDOSHA KABUSHIKI KAISHA, Toyota-shi, Aichi (JP)

(72) Inventors: Kazuhisa Sakashita, Shizuoka (JP); Yuji Noritake, Toyota (JP)

(73) Assignees: KOITO MANUFACTURING CO., LTD., Minato-Ku, Tokyo (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 84 days.

(21) Appl. No.: 14/779,273

(22) PCT Filed: Mar. 17, 2014

(86) PCT No.: PCT/JP2014/001494
§ 371 (c)(1),
(2) Date: Sep. 22, 2015

(87) PCT Pub. No.: WO2014/148028
PCT Pub. Date: Sep. 25, 2014

(65) Prior Publication Data
US 2016/0053957 A1    Feb. 25, 2016

(30) Foreign Application Priority Data

Mar. 22, 2013   (JP) ................. 2013-060930

(51) Int. Cl.
*F21V 5/00*   (2015.01)
*F21S 8/10*   (2006.01)
*B60C 1/00*   (2006.01)

(52) U.S. Cl.
CPC .......... *F21S 48/125* (2013.01); *B60C 1/0041* (2013.01); *F21S 48/1266* (2013.01);
(Continued)

(58) Field of Classification Search
CPC .............. F21S 48/1154; F21S 48/1159; F21S 48/1747; B60Q 1/0041
See application file for complete search history.

(56) References Cited

U.S. PATENT DOCUMENTS 4,791,402 A  * 12/1988  Vaughn ................ B60Q 1/0041
                                                        340/468
2008/0043485 A1   2/2008  Koerner et al.
(Continued)

FOREIGN PATENT DOCUMENTS

CN   1140817 A   1/1997
CN   1865766 A  11/2006
(Continued)

OTHER PUBLICATIONS

Chinese Office Action dated Oct. 24, 2016 issued in corresponding Chinese Patent Appln. No. 201480016400.X, with English translation (14 pages).
(Continued)

*Primary Examiner* — Alexander Garlen
(74) *Attorney, Agent, or Firm* — Buchanan Ingersoll & Rooney PC

(57) ABSTRACT

An automotive lamp includes: a first lamp unit that has a first projection lens whose vertical length is longer than the horizontal length thereof when viewed from the front of the lamp and that is used for forming a low beam light distribution pattern; and a second lamp unit that has a second projection lens whose horizontal length is longer than the vertical length thereof when viewed from the front of the lamp and that is used for forming a low beam light distribution pattern. The first lamp unit and the second lamp unit are arranged such that one end of the first projection lens and one end of the second projection lens are adjacent to each other.

4 Claims, 6 Drawing Sheets

(52) U.S. Cl.
CPC ....... *F21S 48/1747* (2013.01); *F21S 48/1154* (2013.01); *F21S 48/1159* (2013.01)

(56) References Cited

U.S. PATENT DOCUMENTS

| | | |
|---|---|---|
| 2008/0316759 A1 | 12/2008 | Valcamp et al. |
| 2009/0190324 A1 | 7/2009 | Watanabe et al. |
| 2009/0201694 A1* | 8/2009 | Okada .................. F21S 48/215 362/516 |
| 2011/0199776 A1 | 8/2011 | Takahashi et al. |
| 2014/0268851 A1* | 9/2014 | Boyce .................. F21S 48/215 362/517 |

FOREIGN PATENT DOCUMENTS

| | | |
|---|---|---|
| CN | 101559733 A | 10/2009 |
| CN | 102162617 A | 8/2011 |
| EP | 2357397 A2 | 8/2011 |
| EP | 2484960 A2 | 8/2012 |
| JP | 2008-71751 A | 3/2008 |
| JP | 2008-243477 | 10/2008 |
| JP | 2009-179113 A | 8/2009 |
| JP | 2009-272307 A | 11/2009 |
| JP | 2010073426 A | 4/2010 |
| JP | 2011-171044 A | 9/2011 |
| WO | 2007031170 A1 | 3/2007 |
| WO | 2013037799 A1 | 3/2013 |

OTHER PUBLICATIONS

Extended European Search Report dated Oct. 10, 2016 issued in corresponding European Patent Appln. No. 14768003.7 (6 pages).

International Search Report (PCT/ISA/210) mailed on May 13, 2014, by the Japanese Patent Office as the International Searching Authority for International Application No. PCT/JP2014/001494. (6 pages).

Written Opinion (PCT/ISA/237) mailed on May 13, 2014, by the Japanese Patent Office as the International Searching Authority for International Application No. PCT/JP2014/001494. (4 pages).

International Preliminary Report on Patentability (Form PCT/IPEA/409), issued on Jun. 2, 2015, in the corresponding International Application No. PCT/JP2014/001494. (17 pages).

The Written Opinion of the International Searching Authority (From PCT/ISA/237) issued on May 13, 2014, by the Japanese Patent Office in corresponding International Application No. PCT/JP2014/001494, with English Translation. (8 pages).

Office Action (Notification of Reason(s) for Refusal) issued on Feb. 10, 2015, by the Japanese Patent Office in corresponding Japanese Patent Application No. 2013-060930, and an English Translation of the Office Action. (6 pages).

Office Action (Notification of Reason(s) for Refusal) issued on May 12, 2015, by the Japanese Patent Office in corresponding Japanese Patent Application No. 2013-060930, and an English Translation of the Office Action. (6 pages).

* cited by examiner

AUTOMOTIVE LAMP

BACKGROUND OF THE INVENTION

1. Field of the Invention

The present invention relates to an automotive lamp and, more particularly, to an automotive lamp used in a vehicle such as an automobile.

2. Description of the Related Art

Patent document No. 1 discloses an automotive lamp that forms a low beam light distribution pattern, using a plurality of lamp units. More specifically, a first unit for forming a low beam light distribution pattern (the light distribution pattern of a low beam) has three subunits. Each of the subunits forms any one of a pattern for forming a hot zone, a pattern for forming a cutoff line that is larger than the pattern for forming a hot zone, a pattern for forming a diffusion area that extends more in a transverse direction than the pattern for forming a cutoff line, and the three patterns are superimposed on one another to form a low beam light distribution pattern.

[Patent document No. 1] Japanese Patent Application Publication No. 2008-243477

In recent years, automotive lamps have been multi-functionalized, and there is a tendency that lamp units are increased in size and that the number of lamp units to be mounted is increased. On the other hand, there is also a demand for miniaturization of automotive lamps. In other words, there is a demand for both an increase in the size of lamp units and the number of lamp units to be mounted and the miniaturization of an automotive lamp in which the lamp units are mounted. However, there is room for improvement in the above-described conventional automotive lamps in order to achieve both the increase in the size of lamp units and the number of lamp units to be mounted and the miniaturization of an automotive lamp.

SUMMARY OF THE INVENTION

In this background, a purpose of the present invention is to provide a technology for achieving both an increase in the size of lamp units and the number of lamp units to be mounted and the miniaturization of an automotive lamp.

An embodiment of the present invention relates to an automotive lamp. The automotive lamp includes: a first lamp unit that has a first projection lens whose vertical length is longer than the horizontal length thereof when viewed from the front of the lamp and that is used for forming a low beam light distribution pattern; and a second lamp unit that has a second projection lens whose horizontal length is longer than the vertical length thereof when viewed from the front of the lamp and that is used for forming a low beam light distribution pattern. The first lamp unit and the second lamp unit are arranged such that one end of the first projection lens and one end of the second projection lens are adjacent to each other.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
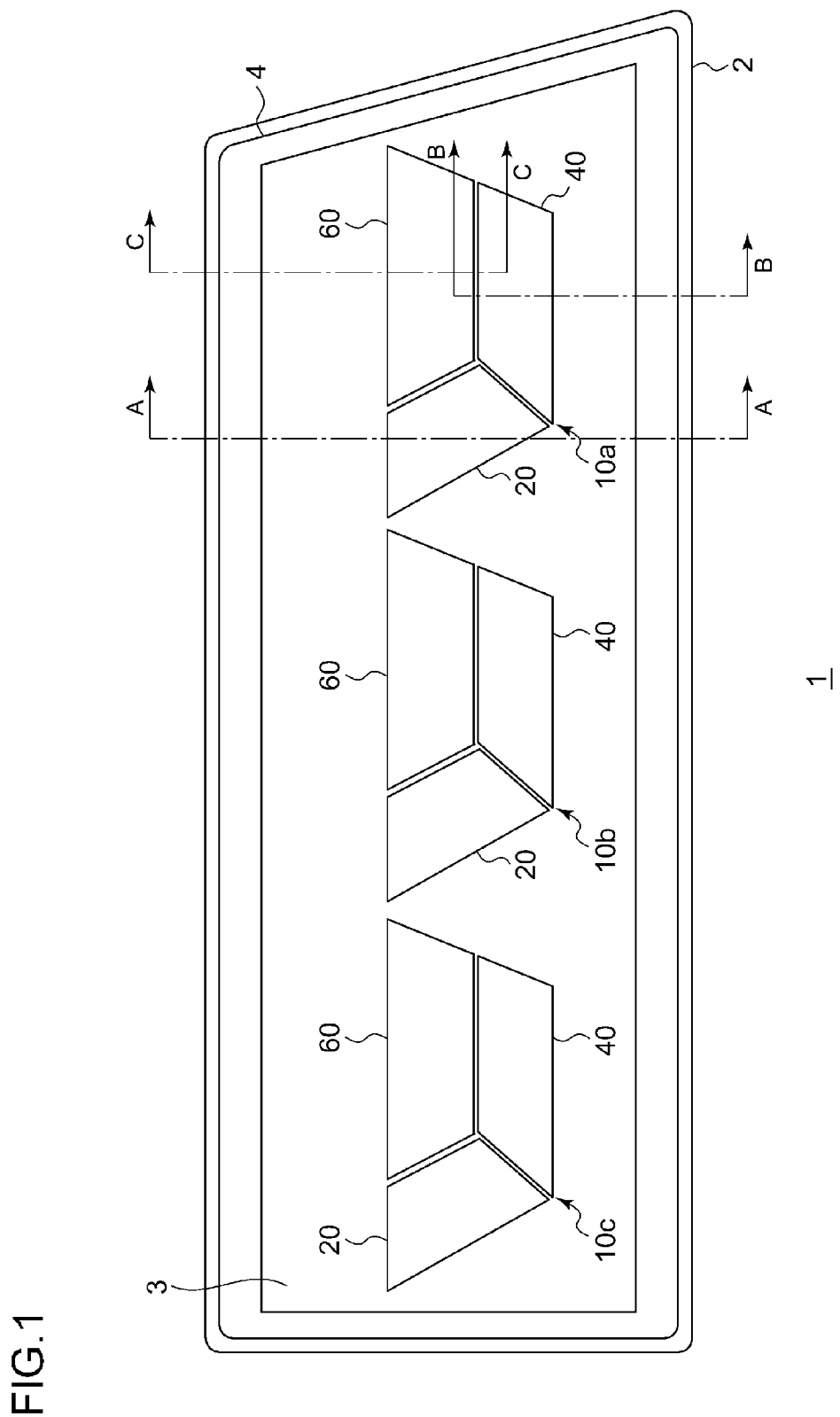
FIG. 1 is a front view illustrating a schematic structure of an automotive lamp according to an embodiment.

An embodiment of the present invention relates to an automotive lamp. The automotive lamp includes: a first lamp unit that has a first projection lens whose vertical length is longer than the horizontal length thereof when viewed from the front of the lamp and that is used for forming a low beam light distribution pattern; and a second lamp unit that has a second projection lens whose horizontal length is longer than the vertical length thereof when viewed from the front of the lamp and that is used for forming a low beam light distribution pattern. The first lamp unit and the second lamp unit are arranged such that one end of the first projection lens and one end of the second projection lens are adjacent to each other.

According to this embodiment, a dead space that is created by the installation of a lamp unit can be reduced compared to a case of a conventional automotive lamp. Therefore, both an increase in the size of lamp units and the number of lamp units to be mounted and the miniaturization of an automotive lamp can be achieved.

In the above embodiment, the vertical length of the first projection lens may be longer than the vertical length of the second projection lens when viewed from the front of the lamp, and the horizontal length of the second projection lens may be longer than the horizontal length of the first projection lens when viewed from the front of the lamp. According to this, the degree of freedom in the arrangement of lamp units can be increased. In any one of the above embodiments, the first lamp unit may form a first pattern that constitutes a portion of the low beam light distribution pattern, and the second lamp unit may form a second pattern that constitutes the other portion of the low beam light distribution pattern and that has a shape more diffused than the first pattern. According to this, the utilization efficiency of light from a light source in each lamp unit can be increased.

In any one of the above embodiments, the first lamp unit and the second lamp unit may be arranged such that the first projection lens and the second projection lens form a substantially L shape. This allows for a further reduction in a dead space. In the above embodiment, the automotive lamp may further includes: a third lamp unit that is arranged such that the third lamp unit lines up horizontally with the first lamp unit and lines up vertically with the second lamp unit when viewed from the front of the lamp. This allows for the miniaturization of the automotive lamp.

A description will be given of an embodiment of the present invention with reference to the drawings. The same or equivalent constituting elements, members, and processes illustrated in each drawing shall be denoted by the same reference numerals, and duplicative explanations will be omitted appropriately. Reference herein to details of the illustrated embodiments is not intended to limit the scope of the claims. It should be understood that not all of the features and the combination thereof discussed are essential to the invention.

Before a specific explanation is given regarding an embodiment, an explanation will be given regarding knowledge on which the embodiment is based. In order to achieve both an increase in size of lamp units and the number of lamp units to be mounted and the miniaturization of an automotive lamp in which the lamp units are mounted, one possible option is to manage a space inside a lamp chamber of the automotive lamp that allows for an increase in size of lamp units and the installation of a plurality of lamp units. A possible method for managing such a space is to reduce a dead space that is created by the installation of an existing lamp unit and that is difficult to be used for the installation of other lamp units or other members. However, as a result of intensive study, the present inventors have found that there is room for improvement in order to reduce a dead space since each subunit of a first unit is provided with a projection lens having a substantially perfect circle shape when viewed from the front of an above-described conventional automotive lamp and achieved an automotive lamp according to the present embodiment.

Figure 2:
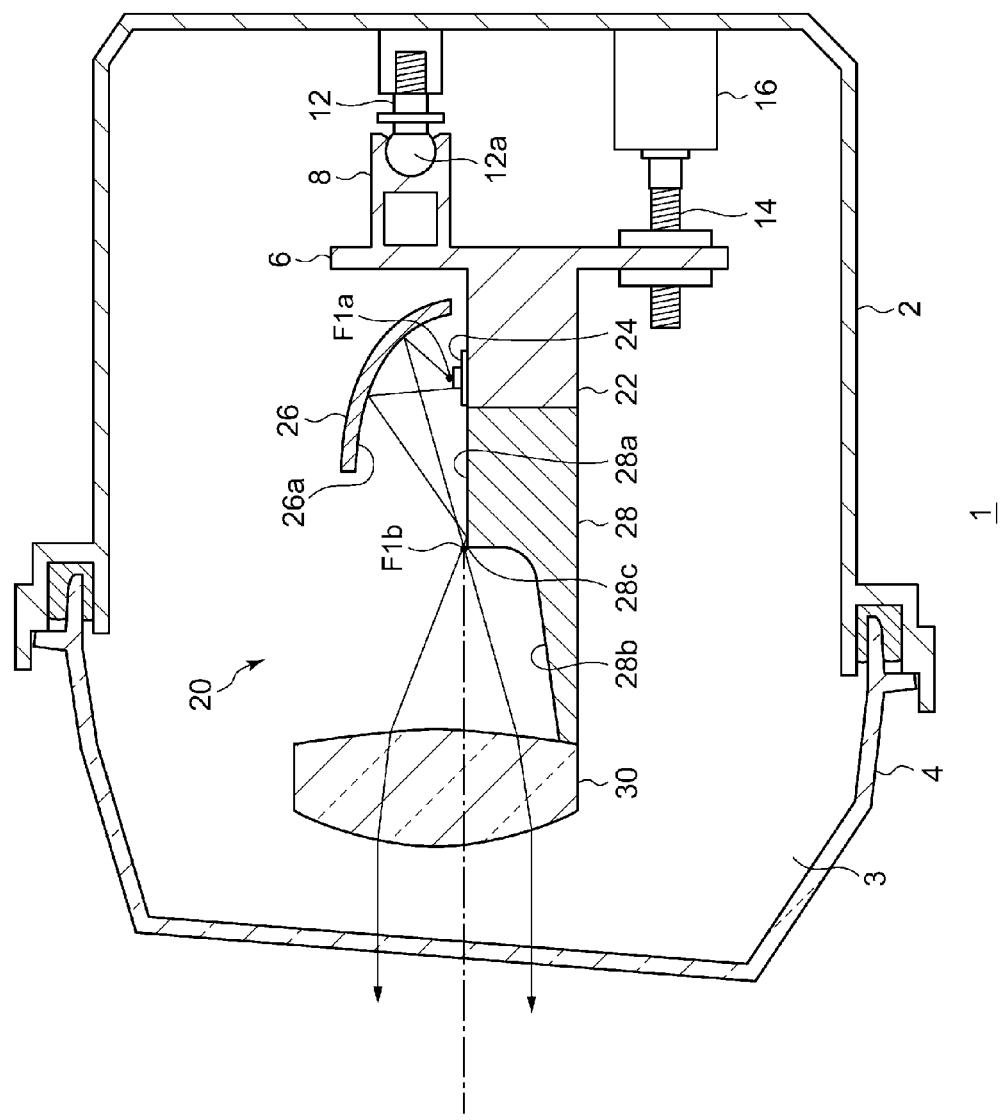
FIG. 2 is a cross sectional view along line A-A of FIG. 1.
Figure 3:
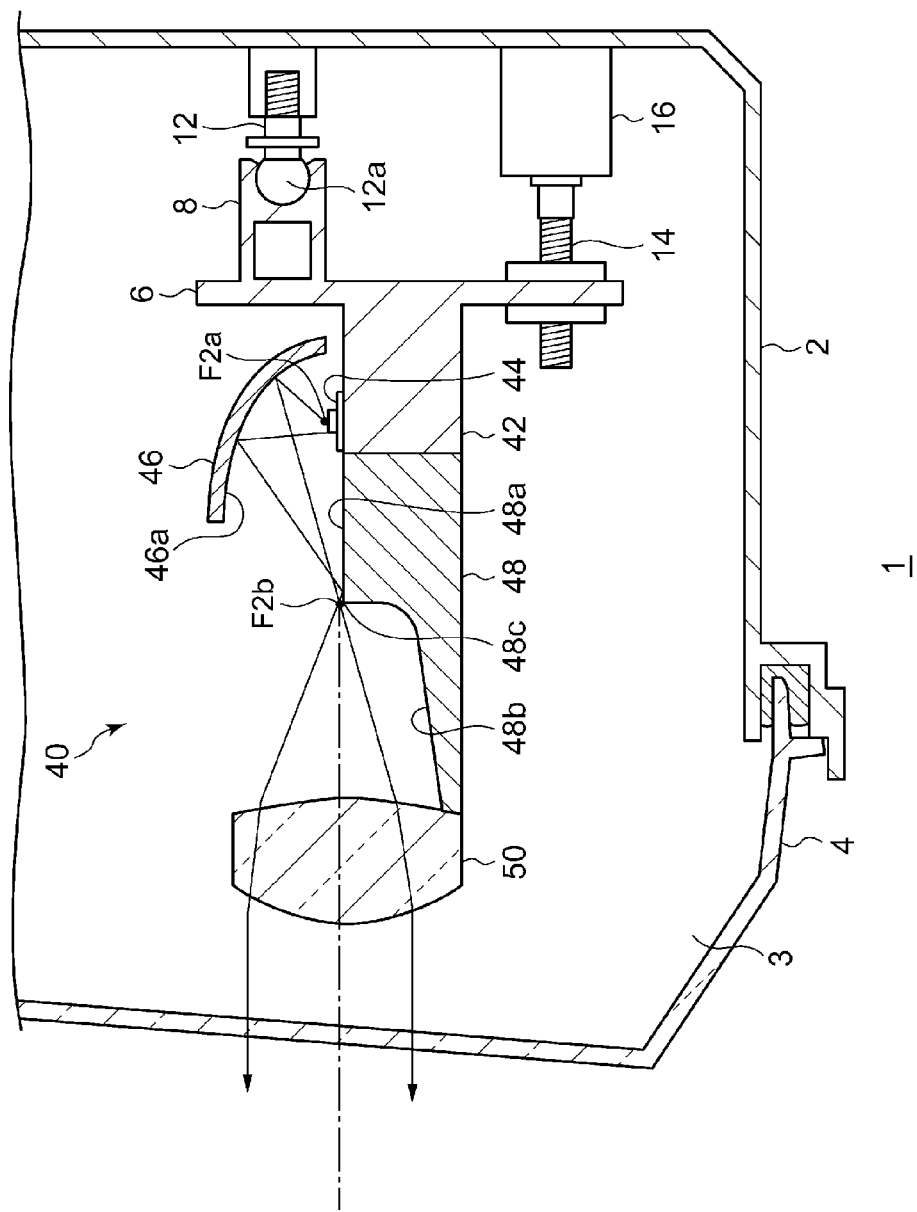
FIG. 3 is a cross sectional view along line B-B of FIG. 1.
Figure 4:
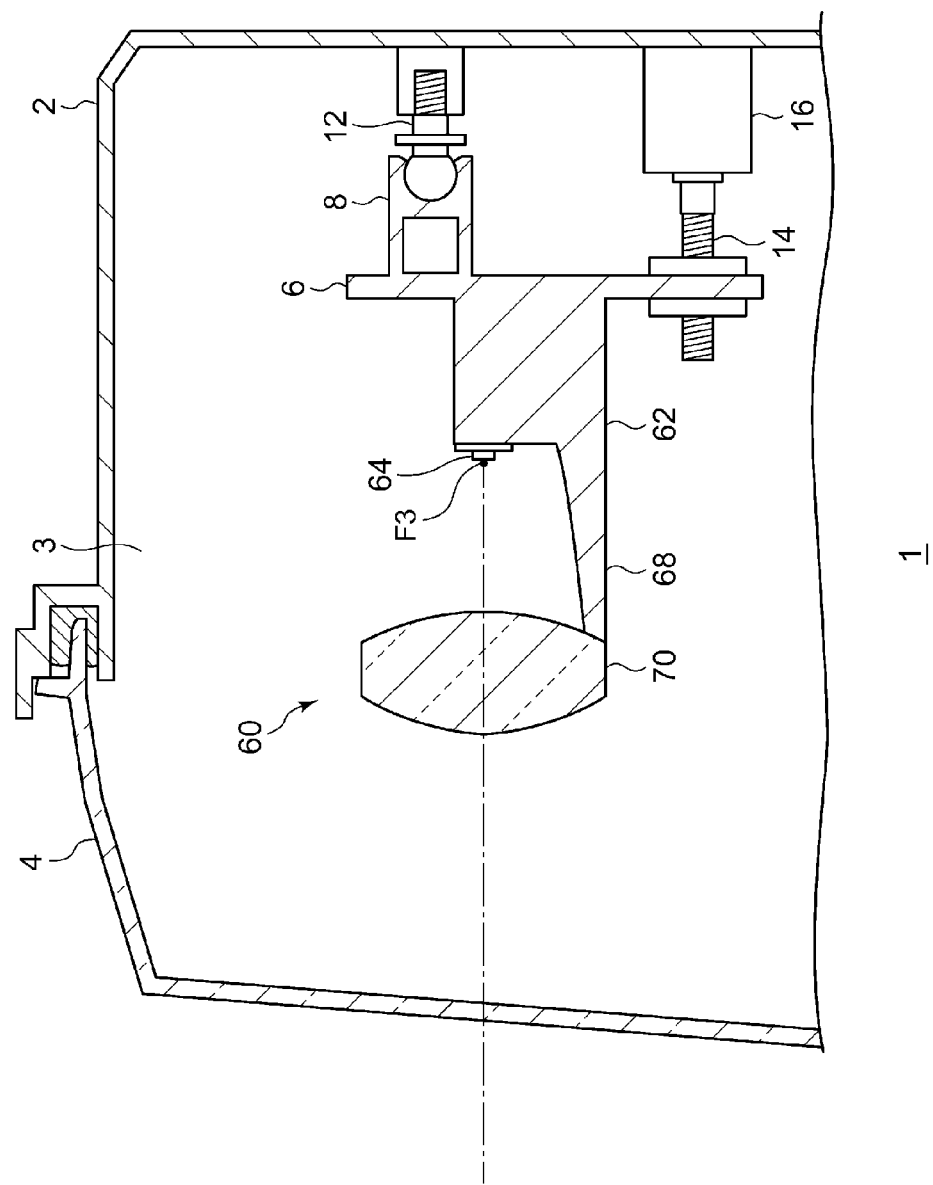
FIG. 4 is a cross sectional view along line C-C of FIG. 1.

FIG. 1 is a front view illustrating a schematic structure of an automotive lamp according to an embodiment. FIG. 2 is a cross sectional view along line A-A of FIG. 1. FIG. 3 is a cross sectional view along line B-B of FIG. 1. FIG. 4 is a cross sectional view along line C-C of FIG. 1. The illustration of a third lamp unit 60 and the illustration of a second lamp unit 40 are omitted in FIG. 3 and FIG. 4, respectively. An automotive lamp 1 according to the present embodiment is an automotive headlamp apparatus that has a pair of headlamp units disposed on the left and right of the front of a vehicle. The pair of headlamp units have substantially the same structure other than having structures that are bilaterally symmetrical. Thus, the structure of one of the headlamp units is shown as the automotive lamp 1 in FIG. 1.

As shown in FIGS. 1-4, the automotive lamp 1 is provided with a lamp body 2 that has an opening on a frontward side of the vehicle and a translucent cover 4 that is attached to cover the opening of the lamp body 2. The translucent cover 4 is formed of a resin, glass, or the like that is translucent. Three headlamp subunits 10a, 10b, and 10c are accommodated in a lamp chamber 3 formed by the lamp body 2 and the translucent cover 4. The headlamp subunits 10a through 10c each have a first lamp unit 20, a second lamp unit 40, and a third lamp unit 60. The respective structures of a first lamp unit 20 through a third lamp unit 60 provided in each of the headlamp subunits 10a through 10c are substantially consistent except for slight differences in the shape or the like of a reflective surface of a reflector or a projection lens caused due to differences in the shape of a light distribution pattern to be formed. Therefore, a detailed explanation will be given in the following regarding the respective structures of a first lamp unit 20 through a third lamp unit 60 using the first lamp unit 20 through the third lamp unit 60 provided in the headlamp subunit 10a as examples.

In the lamp chamber 3, the first lamp unit 20, the second lamp unit 40, and the third lamp unit 60 are each supported by a bracket 6. The bracket 6 is substantially plate-shaped and is disposed such that main surfaces thereof is directed in the front-back direction of the lamp. A joint bearing unit 8 is provided in the upper part of a back surface of the bracket 6 such that the joint bearing unit 8 projects toward the back of the lamp, and a shaft 12 that extends toward the front of the lamp from a wall surface of a lamp body 2 is connected to the joint bearing unit 8. A ball joint sphere portion 12a is formed at the tip of the shaft 12, and a spherical space that fits the shape of the ball joint sphere portion 12a is formed on the joint bearing unit 8. The joint bearing unit 8 and the shaft 12 are connected when the ball joint sphere portion 12a is housed in the spherical space of the joint bearing unit 8.

A thread hole is provided in the lower part of the bracket 6, and a screw 14 that extends in the front-back direction of the lamp is threadably engaged with this thread hole. A tip of the screw 14 in the backside in the lamp is connected to an actuator 16 that is supported by the wall surface of the lamp body 2. In the automotive lamp 1, the respective optical axes of the first lamp unit 20 through the third lamp unit 60 are adjustable in the vertical and the horizontal directions using a junction between the ball joint sphere portion 12a and the joint bearing unit 8 as a fulcrum by the screw 14 and the actuator 16. The respective brackets 6 of the first lamp unit 20 through the third lamp unit 60 are separated from one another, and the respective optical axes of the lamp units are separately adjustable. The supporting structure of the first lamp unit 20 through the third lamp unit 60 is not particularly limited to this.

As shown in FIG. 2, the first lamp unit 20 is a reflective-type lamp unit and has a first light source mounting portion 22, a first light source 24, a first reflector 26, a first shade member 28, and a first projection lens 30. The first light source mounting portion 22 projects toward the front of the lamp from a main surface of the bracket 6 on the side facing the front of the lamp, and the first light source 24 is mounted on the upper surface thereof. In the present embodiment, the first light source mounting portion 22 and the bracket 6 are formed integrally. The first light source 24 is, for example, a white light-emitting diode (while LED) and has a light emitting device and a substrate that supports this light emitting device. The substrate is a thermally conductive insulating substrate formed of a ceramic or the like. An electrode (not shown) that transmits electric power to the light emitting device is formed in the substrate.

The first reflector 26 has a substantially dome shape and is fixed to the first light source mounting portion 22 such that the first reflector 26 covers the first light source 24. A reflective surface 26a is formed on the inside of the first reflector 26. The reflective surface 26a is constituted by a part of an ellipsoid of revolution and has a focal point F1a and a focal point F1b located further to the front of the lamp than the focal point F1a. The first shade member 28 has a planar part 28a that is disposed approximately horizontally and a bent part 28b that is bent downward in a recessed manner at a position further to the front of the lamp than the planar part 28a. The first reflector 26 is arranged such that the focal point F1a of the reflective surface 26a is positioned near the first light source 24 and such that the focal point F1b is positioned near a ridge line 28c formed by the planar part 28a and the bent part 28b of the first shade member 28.

The first projection lens 30 is constituted of a biconvex lens, which has a convex front surface and a convex rear surface. The first projection lens 30 projects, as an inverted image, a light source image formed on a rear focal plane including a rear focal point of the first projection lens 30 onto a virtual vertical screen in front of the lamp. The first projection lens 30 is disposed such that the rear focal point overlaps with the focal point F1b and is fixed to the tip of the first shade member 28.

The first lamp unit 20 is a lamp unit for forming a low beam light distribution pattern. The ridge line 28c of the first shade member 28 has a shape that corresponds to a cutoff line of a light distribution pattern formed by the first lamp unit 20. Light that is radiated from the first light source 24 is reflected toward the focal point F1b by the reflective surface 26a. Then, a portion of the light is selectively cut by the first shade member 28, and the remaining portion enters the first projection lens 30. The light that has entered the first projection lens 30 is radiated toward the front of the lamp from the first projection lens 30.

As shown in FIG. 3, the second lamp unit 40 is a reflective-type lamp unit and has a second light source mounting portion 42, a second light source 44, a second reflector 46, a second shade member 48, and a second projection lens 50. The second light source mounting portion 42 projects toward the front of the lamp from a main surface of a bracket 6 on the side facing the front of the lamp, and the second light source 44 is mounted on the upper surface thereof. In the present embodiment, the second light source mounting portion 42 and the bracket 6 are formed integrally. The second light source 44 has the same configuration as that of the first light source 24.

The second reflector 46 has a substantially dome shape and is fixed to the second light source mounting portion 42 such that the second reflector 46 covers the second light source 44. A reflective surface 46a is formed on the inside of the second reflector 46. The reflective surface 46a is constituted by a part of an ellipsoid of revolution and has a focal point F2a and a focal point F2b located further to the front of the lamp than the focal point F2a. The second shade member 48 has a planar part 48a that is disposed approximately horizontally and a bent part 48b that is bent downward in a recessed manner at a position further to the front of the lamp than the planar part 48a. The second reflector 46 is arranged such that the focal point F2a of the reflective surface 46a is positioned near the second light source 44 and such that the focal point F2b is positioned near a ridge line 48c formed by the planar part 48a and the bent part 48b of the second shade member 48.

The second projection lens 50 is constituted of a biconvex lens, which has a convex front surface and a convex rear surface. The second projection lens 50 projects, as an inverted image, a light source image formed on a rear focal plane including a rear focal point of the second projection lens 50 onto a virtual vertical screen in front of the lamp. The second projection lens 50 is disposed such that the rear focal point overlaps with the focal point F2b and is fixed to the tip of the second shade member 48.

The second lamp unit 40 is a lamp unit for forming a low beam light distribution pattern. The ridge line 48c of the second shade member 48 has a shape that corresponds to a cutoff line of a light distribution pattern formed by the second lamp unit 40. Light that is radiated from the second light source 44 is reflected toward the focal point F2b by the reflective surface 46a. Then, a portion of the light is selectively cut by the second shade member 48, and the remaining portion enters the second projection lens 50. The light that has entered the second projection lens 50 is radiated toward the front of the lamp from the second projection lens 50.

As shown in FIG. 4, the third lamp unit 60 is a direct-projection type lamp unit and has a third light source mounting portion 62, a third light source 64, a lens holder portion 68, and a third projection lens 70. The third light source mounting portion 62 projects toward the front of the lamp from a main surface of a bracket 6 on the side facing the front of the lamp, and the third light source 64 is mounted on a surface of the third light source mounting portion 62 that is facing the front of the lamp. In the present embodiment, the third light source mounting portion 62 and the bracket 6 are formed integrally. The third light source 64 has the same configuration as that of the first light source 24.

The lens holder portion 68 projects toward the front of the lamp from the third light source mounting portion 62. In the present embodiment, the lens holder portion 68 and the third light source mounting portion 62 are formed integrally. The third projection lens 70 is fixed to the tip of the lens holder portion 68. The third projection lens 70 is constituted of a biconvex lens, which has a convex front surface and a convex rear surface. The third projection lens 70 projects, as an inverted image, a light source image formed on a rear focal plane including a rear focal point of the third projection lens 70 onto a virtual vertical screen in front of the lamp. The third projection lens 70 is disposed so that a rear focal point F3 is positioned near the third light source 64.

The third lamp unit 60 is a lamp unit for forming a high beam light distribution pattern. Light that is radiated from the third light source 64 directly enters the third projection lens 70. The light that has entered the third projection lens 70 is radiated toward the front of the lamp from the third projection lens 70. The third lamp unit 60 may be a lamp unit that forms other distribution patterns.

Figure 5:
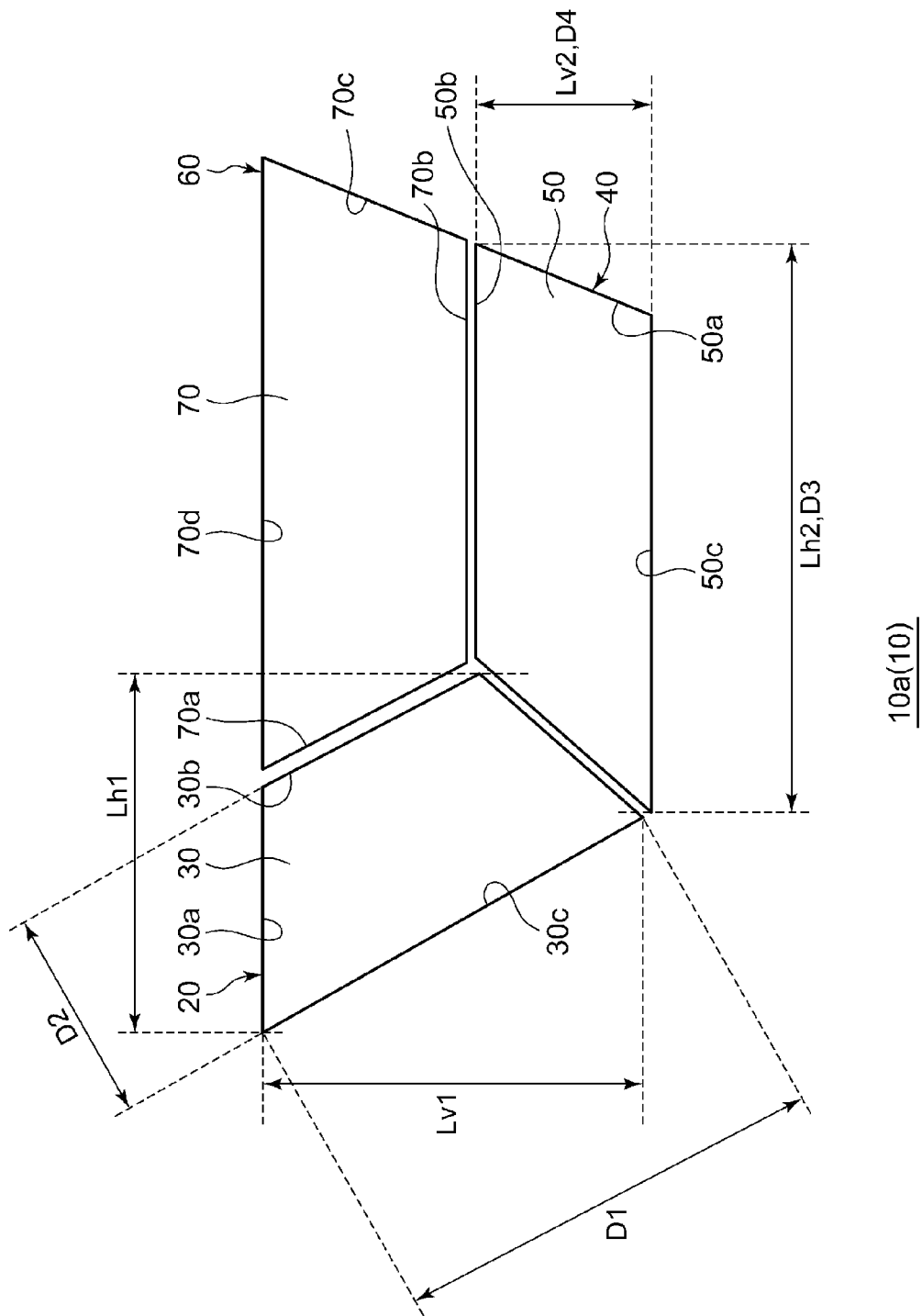
FIG. 5 is a front view illustrating a schematic structure of a headlamp subunit in the automotive lamp according to the embodiment.

A detailed description will be given next regarding the shape and arrangement of a projection lens of each lamp unit. FIG. 5 is a front view illustrating a schematic structure of a headlamp subunit in an automotive lamp according to the embodiment. As described above, since the respective structures of the headlamp subunits 10a through 10c are substantially the same, an explanation will be given regarding the shape and arrangement of a projection lens of each lamp unit using the headlamp subunit 10a as an example in the following.

The first projection lens 30 of the first lamp unit 20 has a substantially quadrilateral shape when viewed from the front of the lamp, and a vertical length Lv1, i.e., a height dimension, is larger than a horizontal length Lh1, i.e., a width dimension (Lv1>Lh1). The second projection lens 50 of the second lamp unit 40 has a substantially quadrilateral shape when viewed from the front of the lamp, and a horizontal length Lh2 is larger than a vertical length Lv2 (Lh2>Lv2). The first lamp unit 20 and the second lamp unit 40 are arranged such that one end of the first projection lens 30 and one end of the second projection lens 50 are adjacent to each other.

Also, with regard to a dimension D1 in a first direction and a dimension D2 in a second direction that is orthogonal to the first direction, the first projection lens 30 has an elongated shape where the dimension D1 in the first direction is larger than the dimension D2 in the second direction. In the same way, with regard to a dimension D3 in a third direction and a dimension D4 in a fourth direction that is orthogonal to the third direction, the second projection lens 50 has an elongated shape where the dimension D3 in the third direction is larger than the dimension D4 in the fourth direction. The first projection lens 30 and the second projection lens 50 are oriented such that the first direction and the third direction intersect with each other and arranged such that one end of the first projection lens 30 and one end of the second projection lens 50 are adjacent to each other. For example, the first direction is a direction that is parallel to the longest side 30c in the first projection lens 30, and the third direction is a direction that is parallel to the longest side 50c in the second projection lens 50.

With the first projection lens 30 having a vertically long shape and the second projection lens 50 having a horizontally long shape while one end of the first projection lens 30 and one end of the second projection lens 50 are adjacent to each other, as described above, a dead space can be reduced compared to a case where a plurality of lamp units having a substantially perfect circle shape when viewed from the front of the lamp are arranged. Also, the degree of freedom in the arrangement of lamp units can be increased. A sense of unity between two lamp units for forming a low beam light distribution pattern can be increased so that the two lamp units are viewed as one continuous illuminant. Further, the design of the automotive lamp 1 is able to be a novel design.

In the embodiment, the vertical length Lv1 of the first projection lens 30 is longer than the vertical length Lv2 of the second projection lens 50 when viewed from the front of the lamp (Lv1>Lv2). The horizontal length Lh2 is longer than the horizontal length Lh1 of the first projection lens 30 when viewed from the front of the lamp in the second projection lens 50 (Lh2>Lh1). Thereby, the degree of freedom in the installation of lamp units can be increased. Also, this can contribute to a reduction in a dead space. Further, the first lamp unit 20 and the second lamp unit 40 are arranged such that the first projection lens 30 and the second projection lens 50 form a substantially L shape. This allows for a further reduction in a dead space. Also, this can contribute to an increase in the degree of freedom in the arrangement of lamp units.

The third lamp unit 60 is arranged such that the third lamp unit 60 lines up horizontally with the first lamp unit 20 and lines up vertically with the second lamp unit 40 when viewed from the front of the lamp. In other words, the third lamp unit 60 is arranged in a space located further to the side in the extending direction of the second projection lens 50 than the first projection lens 30 and located further to the side in the extending direction of the first projection lens 30 than the second projection lens 50. By arranging the third lamp unit such that at least a portion of the third lamp unit 60 is housed in a space surrounded by the first projection lens 30 and the second projection lens 50 as described, the headlamp subunits 10a through 10c can be miniaturized, and the automotive lamp 1 can thus be miniaturized eventually. In the present embodiment, the entire third projection lens 70 is housed in a space surrounded by an extension of a side 30a at the other end (an end portion on the side opposite to the side adjacent to the second projection lens 50) of the first projection lens 30 and an extension of a side 50a at the other end (an end portion on the side opposite to the side adjacent to the first projection lens 30) of the second projection lens 50. Therefore, a space required for the installation of the headlamp subunits 10a through 10c can be further reduced.

The third projection lens 70 of the third lamp unit 60 has a substantially quadrilateral shape. A first side 70a adjacent to the first projection lens 30 extends parallel to a side 30b of the first projection lens 30 that is adjacent to the third lamp unit 60, and a second side 70b adjacent to the second projection lens 50 extends parallel to a side 50b of the second projection lens 50 that is adjacent to the third lamp unit 60. Further, a third side 70c facing the first side 70a extends parallel to an extension of the side 50a of the second projection lens 50, and a fourth side 70d facing the second side 70b extends parallel to an extension of the side 30a of the first projection lens 30. Thereby, a sense of unity among the first lamp unit 20 through the third lamp unit 60 can be increased. Further, the design of the automotive lamp 1 is able to be a novel design.

Figure 6A:
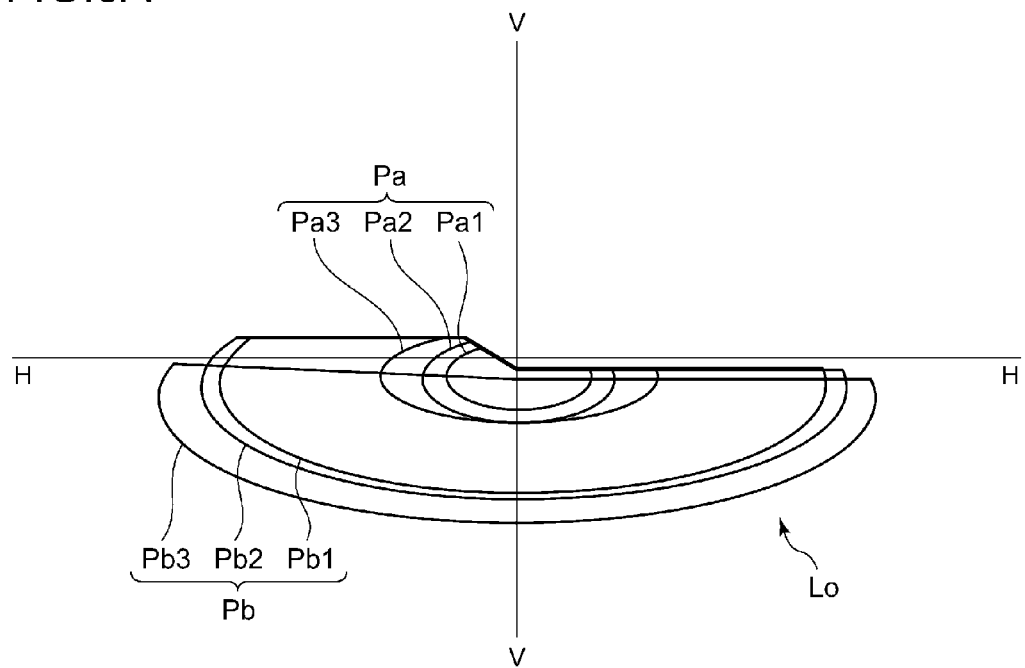
FIG. 6A is a schematic diagram for explaining a light distribution pattern formed by a first lamp unit and a second lamp unit.
Figure 6B:
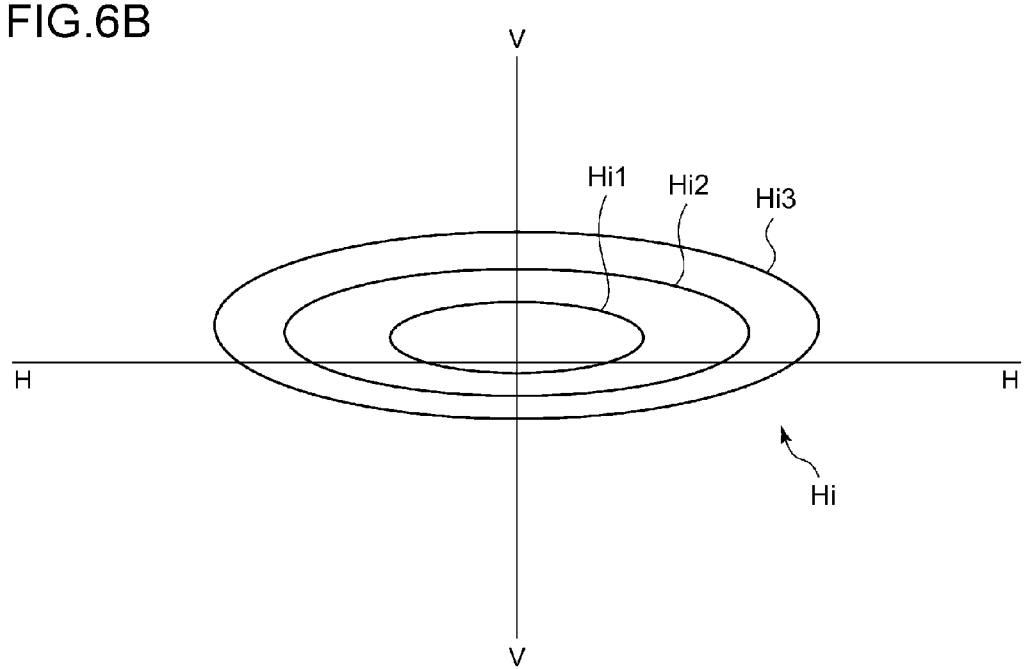
FIG. 6B is a schematic diagram for explaining a light distribution pattern formed by a third lamp unit.

A description will be given next regarding a light distribution pattern formed by the automotive lamp 1. FIG. 6A is a schematic diagram for explaining a light distribution pattern formed by a first lamp unit and a second lamp unit. FIG. 6B is a schematic diagram for explaining a light distribution pattern formed by a third lamp unit. FIGS. 6A and 6B show a light distribution pattern formed on a virtual vertical screen placed at a predetermined position in front of the lamp, for example, at a position that is 25 meters ahead of the lamp.

As shown in FIG. 6A, the first lamp unit 20 forms a first pattern Pa that constitutes a portion of a low beam light distribution pattern Lo. The second lamp unit 40 forms a second pattern Pb that constitutes the other portion of the low beam light distribution pattern Lo. The first pattern Pa has a shape where light is more condensed than the second pattern Pb, and the second pattern Pb has a shape where light is more diffused in the substantially horizontal direction than the first pattern Pa. In the present embodiment, the second pattern Pb has a shape where the second pattern Pb is also more diffused in the substantially vertical direction than the first pattern Pa. The first pattern Pa is superimposed on a central area of the second pattern Pb so as to form the low beam light distribution pattern Lo. The shape of the low beam light distribution pattern Lo is publicly known. Thus, a detailed description thereof is omitted.

The automotive lamp 1 forms a light-condensing pattern by the first lamp unit 20 having the vertically long first projection lens 30 and forms a diffusion pattern that extends in the substantially horizontal direction by the second lamp unit 40 having the horizontally long second projection lens 50. In other words, since a light distribution pattern having a shape that is suitable for the shape of each projection lens is formed, the utilization efficiency of light that is radiated from each light source can be increased.

In the present embodiment, a first pattern Pa1 is formed by a first lamp unit 20 of a headlamp subunit 10a, a first pattern Pa2 that is more diffused than the first pattern Pa1 is formed by a first lamp unit 20 of a headlamp subunit 10b, and a first pattern Pa3 that is more diffused than the first pattern Pa2 is formed by a first lamp unit 20 of a headlamp subunit 10c. A second pattern Pb1 is formed by a second lamp unit 40 of the headlamp subunit 10a, a second pattern Pb2 that is more diffused than the second pattern Pb1 is formed by a second lamp unit 40 of the headlamp subunit 10b, and a second pattern Pb3 that is more diffused than the second pattern Pb2 is formed by a second lamp unit 40 of the headlamp subunit 10c. Therefore, in the present embodiment, the low beam light distribution pattern Lo is formed by synthesis of the six different light distribution patterns. Differences in shape that lie in the first patterns and differences lie in shape that lie in the second patterns can be achieved by adjusting the respective shapes of the reflective surfaces 26a and 46a, the ridge lines 28c and 48c, the first projection lens 30, the second projection lens 50, and the like. Since a method used therefor is publicly known, a detailed description thereof is omitted.

As shown in FIG. 6B, the third lamp unit 60 forms a high beam light distribution pattern Hi. The high beam light distribution pattern Hi is formed additionally to the low beam light distribution pattern Lo. The shape of the high beam light distribution pattern Hi is publicly known. Thus, a detailed description thereof is omitted. In the present embodiment, a first high beam light distribution pattern Hi1 is formed by a third lamp unit 60 of the headlamp subunit 10a, a second high beam light distribution pattern Hi2 that is more diffused than the first high beam light distribution pattern Hi1 is formed by a third lamp unit 60 of the headlamp subunit 10b, and a third high beam light distribution pattern Hi3 that is more diffused than the second high beam light distribution pattern Hi2 is formed by a third lamp unit 60 of the headlamp subunit 10c. Therefore, in the present embodiment, the high beam light distribution pattern Hi is formed by synthesis of the three different light distribution patterns. Differences in shape that lie in the first high beam light distribution pattern Hi1 through the third high beam light distribution pattern Hi3 can be achieved by adjusting the shape of the third projection lens 70 and the like. Since a method used therefor is publicly known, a detailed description thereof is omitted.

As described, by changing light distribution patterns formed by a first lamp unit 20 through a third lamp unit 60 of each of the plurality of headlamp subunits 10*a* through 10*c*, the shape and the degree of freedom in the illuminance distribution of a light distribution pattern that can be formed by the automotive lamp 1 can be improved. The respective first lamp units 20 of the headlamp units may form light distribution patterns that have the same shape. The same applies to the second lamp units 40 and the third lamp units 60.

As described above, the automotive lamp 1 according to the present embodiment has the first projection lens 30 whose vertical length is longer than the horizontal length when viewed from the front of the lamp and the second projection lens 50 whose horizontal length is longer than the vertical length when viewed from the front of the lamp. The first projection lens 30 and the second projection lens 50 are arranged such that one end of the first projection lens 30 and one end of the second projection lens 50 are adjacent to each other. Thereby, a dead space that is created by the installation of a lamp unit can be reduced compared to a case of a conventional automotive lamp that is provided with a projection lens having a substantially perfect circle shape when viewed from the front of the lamp. As a result, a space can be created inside a lamp chamber 3 of the automotive lamp 1 that allows for an increase in size of lamp units and the installation of a plurality of lamp units. Therefore, both an increase in the size of lamp units and the number of lamp units to be mounted and the miniaturization of the automotive lamp can be achieved. Further, the appearance of the automotive lamp is able to be novel, and the design of the automotive lamp can thus be improved.

The first lamp units 20 through the third lamp units 60 are so-called projector optical systems. Therefore, the light utilization rate can be increased compared to a so-called parabola optical system. Thereby, the first lamp units 20 through the third lamp units 60 are likely to have an elongated shape when viewed from the front of the lamp. The first projection lens 30, the second projection lens 50, and the third projection lens 70 are biconvex lenses. Therefore, the projection of the front surface can be reduced compared to a case where a plano-convex lens having a convex front surface and a plane rear surface is employed as each of the projection lenses. As a result, a sense of unity between adjacent lamp units can be increased.

The invention is not limited to the above-mentioned embodiments, and various modifications, such as a design change, may be added thereto on the basis of knowledge of those skilled in the art. It should be understood that any embodiment to which one or more of the modifications are added is also included in the scope of the invention. New embodiments resulting from the addition of modifications to the aforementioned embodiments will provide the advantages of the embodiments and modifications combined.

The first light source 24, the second light source 44, and the third light source 64 may be light sources other than LED's such as incandescent lamps, electric-discharge lamps, or the like. The automotive lamp 1 has three headlamp subunits 10*a* through 10*c*. However, the number of headlamp subunits is not particularly limited. One or two headlamp subunits may be provided. Alternatively, four or more headlamp subunits may be provided. The three headlamp subunits 10*a* through 10*c* are arranged in the substantially horizontal direction. However, the arrangement is not particularly limited. For example, the three headlamp subunits 10*a* through 10*c* may be arranged in the substantially vertical direction or may be arranged such that the headlamp subunits 10*a* through 10*c* overlap with respective vertex positions of an arbitrary polygon. The first lamp units 20 and the second lamp units 40 may be direct-projection type lamp units. The third lamp units 60 may be reflective-type lamp units.

The invention claimed is:

1. An automotive lamp comprising:
 a first lamp unit that has a first projection lens whose vertical length is longer than the horizontal length thereof when viewed from the front of the lamp and that is used for forming a low beam light distribution pattern; and
 a second lamp unit that has a second projection lens whose horizontal length is longer than the vertical length thereof when viewed from the front of the lamp and that is used for forming a low beam light distribution pattern,
 wherein the first projection lens has a substantially quadrilateral shape when viewed from the front of the lamp and the vertical length thereof is longer than the vertical length of the second projection lens, and the second projection lens has a substantially quadrilateral shape when viewed from the front of the lamp and the horizontal length thereof is longer than the horizontal length of the first projection lens when viewed from the front of the lamp, and
 wherein the first lamp unit and the second lamp unit are arranged such that one end of the first projection lens and one end of the second projection lens are adjacent to each other and such that the first projection lens and the second projection lens form a substantially L shape, and the automotive lamp further comprising:
 a third lamp unit for forming a high beam light distribution pattern,
 wherein the third lamp unit lines up horizontally with the first lamp unit and vertically with the second lamp unit when viewed from the front of the lamp and is arranged in a space surrounded by an extension of a side at an end portion located on the side opposite to the side adjacent to the second projection lens in the first projection lens and an extension of a side at an end portion located on the side opposite to the side adjacent to the first projection lens in the second projection lens.

2. The automotive lamp according to claim 1,
 wherein the first lamp unit forms a first pattern that constitutes a portion of the low beam light distribution pattern, and
 wherein the second lamp unit forms a second pattern that constitutes the other portion of the low beam light distribution pattern and that has a shape more diffused in the substantially horizontal direction than the first pattern.

3. The automotive lamp according to claim 1,
 wherein the third lamp unit has a third projection lens, and
 wherein the third projection lens has a substantially quadrilateral shape when viewed from the front of the lamp and, in the third projection lens, a side facing a side that is adjacent to the first projection lens extends parallel to an extension of a side at an end portion located on the side opposite to the side adjacent to the first projection lens in the second projection lens, and a side facing a side that is adjacent to the second projection lens extends parallel to an extension of a side at an end portion located on the side opposite to the side adjacent to the second projection lens in the first projection lens.

4. The automotive lamp according to claim 2, wherein the third lamp unit has a third projection lens, and wherein the third projection lens has a substantially quadrilateral shape when viewed from the front of the lamp and, in the third projection lens, a side facing a side that is adjacent to the first projection lens extends parallel to an extension of a side at an end portion located on the side opposite to the side adjacent to the first projection lens in the second projection lens, and a side facing a side that is adjacent to the second projection lens extends parallel to an extension of a side at an end portion located on the side opposite to the side adjacent to the second projection lens in the first projection lens.

* * * * *